(12) United States Patent
Tian et al.

(10) Patent No.: US 12,577,415 B2
(45) Date of Patent: Mar. 17, 2026

(54) ASSOCIATIVE RHEOLOGY MODIFIER COMPOSITION AND METHODS FOR MAKING THEREOF

(71) Applicant: Kraton Polymers LLC, Houston, TX (US)

(72) Inventors: Jason Tian, Houston, TX (US);
Ruidong Ding, Houston, TX (US);
Donna Rucker, Savannah, GA (US);
Chad Reiter, Savannah, GA (US)

(73) Assignee: Kraton Corporation, The Woodlands, TX (US)

( * ) Notice: Subject to any disclaimer, the term of this patent is extended or adjusted under 35 U.S.C. 154(b) by 937 days.

(21) Appl. No.: 17/662,674

(22) Filed: May 10, 2022

(65) Prior Publication Data

US 2022/0363922 A1 Nov. 17, 2022

Related U.S. Application Data

(60) Provisional application No. 63/201,738, filed on May 11, 2021.

(51) Int. Cl.
| | |
|---|---|
| *C09D 7/65* | (2018.01) |
| *C08L 23/0846* | (2025.01) |
| *C08L 93/04* | (2006.01) |
| *C09D 125/08* | (2006.01) |

(52) U.S. Cl.
CPC ............ *C09D 7/65* (2018.01); *C08L 23/0846* (2013.01); *C08L 93/04* (2013.01); *C09D 125/08* (2013.01)

(58) Field of Classification Search
CPC .......... C09D 7/65; C09D 125/08; C09D 5/00; C09D 171/02; C08L 23/0846; C08L 93/04; C08L 71/02; C08G 81/00; C08G 65/331; C08G 65/3322; C08G 65/3324; C08G 65/33396; C08G 65/3344; C08K 5/0016
See application file for complete search history.

(56) References Cited

U.S. PATENT DOCUMENTS

| | | | | |
|---|---|---|---|---|
| 5,504,152 A | * | 4/1996 | Schluenz | ................. C09F 1/04 |
| | | | | 530/211 |
| 2017/0190935 A1* | | 7/2017 | Schaapman | ............... C09F 1/04 |

FOREIGN PATENT DOCUMENTS

| | | | |
|---|---|---|---|
| EP | 2036944 A1 | 3/2009 | |
| KR | 20180070017 A | 6/2018 | |
| WO | 2017117576 A1 | 7/2017 | |

* cited by examiner

*Primary Examiner* — Kumar R Bhushan

(57) ABSTRACT

An associative rheology modifier is obtained by coupling of a rheology modifier precursor with a coupling agent. The rheology modifier precursor is formed by reacting a rosin acid with a polyether at a mole ratio of the rosin acid to the polyether of >2:1, at a temperature from 180-350° C. and in the presence of an acid catalyst. The polyether has a molecular weight of 500-10,000 g/mol and the rheology modifier precursor has a water solubility of >10 wt. % concentration. The associative rheology modifier has a molecular weight (Mw) from 1500-25,000 g/mol. The associative rheology modifier shows a high shear thinning effect at low shear rate. A composition is also provided comprising the associative rheology modifier.

20 Claims, No Drawings

ASSOCIATIVE RHEOLOGY MODIFIER COMPOSITION AND METHODS FOR MAKING THEREOF

RELATED APPLICATIONS

This application claims priority from U.S. Provisional Application No. 63/201,738 with a filing date of May 11, 2021, the disclosure of which is incorporated herein by reference.

FIELD

The present disclosure relates to an associative rheology modifier, a composition and method for making thereof.

BACKGROUND

Rheology modifiers are known to control a viscosity of a formulation over a wide shear rate range. In particular, the rheology modifier provides a large thickening effect at low cost and can be used for a wide range of applications including coatings, paints, lacquers, etc. In order to obtain an efficient thickening effect, specifically with the use of water-soluble rheology modifier, it is necessary to design the rheology modifier which has a suitable molecular weight and water compatibility. Moreover, most of rheology modifiers are produced from petrochemical feedstocks and there is a demand for environmentally friendly rheology modifiers.

A rosin is a natural, abundant, cheap, and non-toxic raw material which can be easily modified to obtain a number of useful products. Desired reactive functional groups can be introduced into the rosin to improve many thermal, physical, mechanical, and functional properties of final materials. A rosin-based rheology modifier can be obtained by incorporating suitable functional groups into the rosin. The performance of a composition for example, waterborne paints can be improved through the addition of known rheological modifiers. Some of the rheology modifiers such as inorganic clays and high molecular weight polymers improve the viscosity during application but fails at leveling of the paint which results in unsightly brush and roller marks after the paint dries. An associative rheology modifier having a low molecular weight and a desired water solubility, improves the overall performance of the composition.

Therefore, there is a need for a rheology modifier that can provide better shear thinning effect when added to the composition. Particularly, high shear thinning effect at low shear rates and said shear thinning effect is unaffected by other additives added to the composition.

SUMMARY

In one aspect, the disclosure provides an associative rheology modifier obtained by coupling of a rheology modifier precursor with a coupling agent. The rheology modifier precursor is formed by reacting a rosin acid with a polyether at a mole ratio of the rosin acid to the polyether of >2:1, at a temperature from 180-350° C. and in the presence of an acid catalyst. The polyether has a molecular weight of 500-10,000 g/mol and the rheology modifier precursor has a water solubility of >10 wt. % concentration. The associative rheology modifier has a molecular weight (Mw) from 1,500-25,000 g/mol; and an apparent viscosity of 100,000-2,000 cP at a shear rate from 1500-5,000 s-1 and an apparent viscosity of 2,000-100 cP at a shear rate from 5,000-20,000 s-1, at a concentration of 25 wt. % in water and a temperature of 25° C.

In a second aspect, the polyether is selected from the group of polyether glycols, polyetheramine (i.e., Jeffamine), and the mixture thereof, and said polyether has at least one functional group selected from a hydroxyl group and an amine group.

In another aspect, the rosin acid is reacted with the polyethylene glycol to obtain a polyethylene glycol end-capped rosin with an ester linkage.

In still another aspect, the rosin acid is reacted with the polyetheramine, to obtain a polyetheramine, end-capped rosin with an amide linkage.

DESCRIPTION

The following terms used in the specification have the following meanings:

"Rheology modifier" or viscosity modifier refers to a type of additive added in a formulation to achieve desired rheological characteristics for the application. Apart from getting desired viscosity, these additives also help in controlling shelf stability of the formulation, ease of application, open time/wet edge and sagging.

"Rosin acid" refers to mixtures of several related carboxylic acids, primarily abietic acid, found in tree resins. In embodiments, the rosin acids have the same basic skeleton as three fused rings having the empirical formula $C_{19}H_{29}COOH$.

"Associative rheology modifier" refers to rheology modifiers that rely on non-specific interactions between the end-groups of a rheology modifier molecules and the surrounding formulation (as well as with themselves).

"Molecular weight" or Mw refers to the polystyrene equivalent molecular weight in g/mol of a polymer block or a block copolymer. Mw can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. Mw of polymers measured using GPC so calibrated are polystyrene equivalent molecular weights or apparent molecular weights. Mw expressed herein is measured at the peak of the GPC trace and are commonly referred to as polystyrene equivalent "peak molecular weights," designated as $M_p$.

The present disclosure is directed to an associative rheology modifier obtained by coupling of a rheology modifier precursor with a coupling agent. The rheology modifier precursor is formed by reacting a rosin acid with a polyether. The associative rheology modifier shows a high shear thinning effect at low shear rate.

Rosin acid: The rosin acid is selected from those natural rosin-based acids, such as those obtained from residues of distillation of natural oils. The rosin acid and its derivatives can be known derivatives of a carbonyl-containing compound known in Organic Chemistry Textbooks, such as "Organic Chemistry", 5th Edition, by Leroy G. Wade.

In embodiments, rosin acids include those that are isolated from black liquor skimming, crude tall oil, tall oil pitch, and distilled tall oil. In addition, rosin acids can be those found in tall oil rosin, gum rosin and wood rosin. These naturally occurring rosins can be suitably mixtures and/or isomers of monocarboxylic tricyclic rosin acids usually containing about 20 carbon atoms. The tricyclic rosin acids differ in the position of the double bonds. The rosin acid can be at least one of levopimaric acid, neoabietic acid, palustric acid, abietic acid, dehydroabietic acid, secodehydroabietic acid, tetrahydroabietic acid, dihydroabietic acid, parinaric acid, palustric acid, and isopimaric acid, or mixtures, isomers, and/or derivatives thereof. The rosins derived from natural sources also include rosins, e.g., rosin mixtures, modified notably by polymerization, isomerization, disproportionation, and hydrogenation.

In embodiments, the rosin acid contains at least one saturated or unsaturated, monocarboxylic aliphatic hydrocarbon or derivative thereof having a linear, branched, and/or cyclic chain, a dimer thereof, a trimer thereof, or mixtures thereof. The saturated or unsaturated, monocarboxylic aliphatic hydrocarbon has number of carbon atoms, for example, from 5 to 30 carbon atoms, or 8 to 24, or 10 to 15, or >7, or <30.

In embodiments, the rosin acid can be subjected to one or more purification steps (e.g., distillation under reduced pressure, extraction, and/or crystallization), if desired, prior to its use as a rosin acid. Hydrogenated rosins and partially hydrogenated rosins can also be used as a rosin acid source.

In embodiments, the rosin acid is reacted with an adduction agent to obtain a rosin acid adduct through a Diels-Alder reaction. The adduction agent is selected from the group consisting of unsaturated acids, anhydrides, and mixtures thereof. Example of adduction agent includes maleic anhydride, maleic acid, fumaric acid, and the like. The Diels-Alder reaction involves the reaction of an α, β-unsaturated carbonyl compound of the adduction agent with a conjugated double bond of the rosin acid.

In embodiments, the rosin acid adduct is reacted with the polyether to form a rheology modifier precursor.

Polyether: The rosin acid is reacted with at least one polyether to obtain the rheology modifier precursor. In embodiments, the polyether has at least one functional group selected from a hydroxyl group and an amine group positioned at any place on the polyether polymer chain. In embodiments, the polyether has the functional group on at least one terminal end of the polyether polymer chain.

In embodiments, the polyether is selected from the group of poly glycols, polyetheramine (i.e., Jeffamine), and mixture thereof. Non-limiting examples of poly glycols include a polyethylene glycol, a polypropylene glycol, a polybutylene glycol, a polytetrahydrofuran, a polytetramethylene glycol, a polytetramethylene ether glycol, and mixtures thereof.

In embodiments, the polyether is selected from polyetheramine, having a polyether backbone typically based on ethylene oxide or propylene oxide units. For example, monoamines, diamines and triamines can be attached to the polyether polymer chain at one or more terminal ends, such as amine-terminated polyethers.

In embodiments, the polyether has a molecular weight (Mw) of 500-10,000 g/mol, or 2000-9,000 g/mol, or 2,000-8,000 g/mol, or 3,000-8,000 g/mol, or ≤8,000 g/mol.

In embodiments, the polyether is a polyethylene glycol (PEG), having a molecular weight (Mw) of 1,000-10,000 g/mol, or 2,000-9,000 g/mol, or 2,000-8,000 g/mol, or 3,000-8,000 g/mol, or ≤8,000 g/mol.

In embodiments, the polyether is a polyetheramine, having a molecular weight (Mw) of 500-5,000 g/mol, or 500-4,000 g/mol, or 500-3,000 g/mol, or 500-2,500 g/mol, or ≤3,000 g/mol.

Rheology Modifier Precursor: To obtain the rheology modifier precursor, the rosin acid is reacted with the polyether at a mole ratio of 2:1-4:1, or 2.25:1-3.75:1, or 2.5:1-3.5:1, or 2.75:1-3.25:1, or >2:1, or <4:1. In embodiments, the rosin acid is present in an amount of 50-75 mol. %, or >55 mol. %, or up to 75 mol. %, or up to 90 mol. %, excess compared to the amount of the polyether, based on the total mol. %.

In embodiments, with the polyether being a PEG, the reaction results in a PEG-end-capped rosin with an ester linkage. The PEG end-capped rosin is obtained by having a ratio of an acid number of rosin acid to a hydroxyl number of PEG of 1:1. For embodiments with polyether being a polyetheramine, end-capped rosin is obtained with an amide linkage, with a mole ratio of an acid number of rosin acid to an amine number of the polyetheramine, is 1:1.

In embodiments, the rheology modifier precursor is obtained by reacting a rosin dimer with at least one polyether at a mole ratio of the rosin dimer to the polyether of 2:1-3:1, or 2.25:1-2.75:1, or >2:1, or >3:1.

In embodiments, the rosin acid is reacted with the polyether in an acidic condition, at atmospheric pressure and under non-active nitrogen containing gas environment. Examples of catalysts for promoting the reaction between the rosin acid and the polyether include Brønsted acids and Lewis acids. Examples of Brønsted acid include but are not limited to mineral acids, organic acids, heteropolyacids, zeolites, acid clays, sulfated zirconia, and mixtures thereof. Examples of catalysts forming the precursor include but are not limited to hydrochloric acid, nitric acid, phosphoric acid, hypophosphorous acid, sulfuric acid, boric acid, hydrofluoric acid, hydrobromic acid, hydroiodic acid, toluenesulfonic acid, formic acid, acetic acid, oxalic acid, trifluoroacetic acid, calcium-bis(((3,5-bis(1,1-dimethylethyl)-4-hydroxyphenyl)methyl)-ethylphosphonate and the like.

In embodiments, the water solubility of the rheology modifier precursor is dependent on the molecular weight (Mw) of the polyether used, e.g., a PEG, to react with the rosin acid. In embodiments with PEG having a Mw of 8,000 g/mol, the water solubility of a rheology modifier precursor is higher than the water solubility of a precursor made with a lower Mw PEG, e.g., <3,000 g/mol. In examples with PEG having a low Mw, e.g., <500 g/mol, the rheology modifier precursor does not have sufficient water solubility.

In embodiments, the rheology modifier precursor has a molecular weight (Mw) of 1,000-15,000 g/mol, or 1,000-14,000 g/mol, or 1,000-12,000 g/mol, or 2,000-11,000 g/mol, or >4,000 g/mol, or <18,000 g/mol.

In embodiments, the rheology modifier precursor has a polydispersity index (PI) ranging from 1.4-8.0, or 1.5-7, or 1.6-6, or 1.7-5.5, or 1.8-5, or >1.5, or <7.

In embodiments, the rheology modifier precursor has a viscosity of 1,000-30,000 cP, or 5,000-25,000 cP, or 1,000-20,000, or 5,000-20,000 cP, or 10,000-20,000 cP, or <20,000 cP, at 25 wt. % concentration of the precursor in water measured at a temperature of 25° C.

In embodiments, the rheology modifier precursor has an acid value of 1-30 mg KOH/g, or 2-28, or 3-25, or 4-20, or 5-15, or <20, or <30 KOH/g.

In embodiments, the rheology modifier precursor has a Hunter color value of 1.2-9, or 1.5-8, or 2-8, or <8.

In embodiments, the rheology modifier precursor has a water solubility of >10 wt. % concentration at a temperature of 25° C., or 10-100 wt. %, or 20-100 wt. %, or 30-70 wt. %, or 40-60 wt. %, or >25 wt. %, or ≤200 wt. %, or ≤300 wt. %, all at 25° C., based on the total weight of the rheology modifier precursor and water.

Associative Rheology Modifier: The rheology modifier precursor has carbon-carbon double bonds that are reactive to a coupling agent, which allows formation of an associative rheology modifier. As the coupling agent, free radical initiators are especially desirable. They generate radicals at elevated temperature or under the triggering effect of UV or other energy sources. Examples include sulfur-based agents, peroxide-based agents, acrylate-based agents, tellurium, selenium, polysulfide polymers, metallic oxides, and di-isocyanates. Non-limiting examples of sulfur-based coupling agents include $S_2Cl_2$, elemental sulfur, and sulfur donor compounds that liberate sulfur under the coupling conditions. Some examples of sulfur donor compounds include tetramethyl thiuram disulfide, 4,4'-dithiodimorpholine, dipentamethylene thiuram tetrasulfide, and thiocarbonyl sulfenamide, dibenzothiazole, N-cyclohexyl-2-benzothiazole, zinc dimethyl dithiocarbamate, thiourea, xanthates, and thiophosphates.

In embodiments, the acrylate-based coupling agent is selected from multifunctional acrylates having >2 acrylate groups, for example trimethylolpropane triacrylate, trimethylolpropane trimethacrylate, 1,6-bishexanedioldiacrylate, neopentyl glycol diacrylate, tetraethylene glycol diacrylate, and the like.

Other coupling agents include divinylbenzene, 1,3-diisopropenylbenzene, trimethylallyl isocyanurate, triallyl isocyanurate, 1,3,5-triazine-2,4,6(1H,3H,5H)-trithione, pentaerythritol tetra(3-mercaptopropionate), tris[2-(3-mercaptopropionyloxy)ethyl] isocyanurate, 1,2-ethanedithiol, 2,4,6-triallyloxy-1,3,5-triazine, N,N-1,3-phenylenediamaleimide, and the like.

In embodiments, enough coupling agent is used for the rheology modifier precursor to be effectively coupled. If the amount of coupling agent is low, the associative rheology modifier may not have desired properties and an undesired gel formation occurs in case of use of higher amount of the coupling agent.

In embodiments, the coupling agent is used in an amount from 0.1-15 wt. %, or 0.3-12 wt. %, or 1-10 wt. %, or 3-10 wt. %, or 3-8 wt. %, based on the total weight of the rheology modifier precursor.

Preparation of Associative Rheology Modifier: The associative rheology modifier can be prepared by mixing the rheology modifier precursor and the coupling agent, at a temperature of 25-300° C., or 25-250° C., or 25-200° C., or ≤280° C. In embodiments, the reaction time is <1 hour, or <30 minutes, or >5 minutes, to provide the associative rheology modifier.

In embodiments, a radical inhibitor is added into the coupling reaction system to prevent the coupling agent from homopolymerization. The radical inhibitors are phenol, thio-based, amine-based, or quinone-based, e.g., p-phenylenediamines, hydroxylamines like diethyl hydroxylamine, phenothiazine 4-tert-butyl catechol, 4-methoxyphenol or tetrahydroquinone or butylated hydroxytoluene and mixtures thereof. In embodiments, the radical inhibitor is added into the coupling reaction in an amount of 500-10000 ppm, based on the total weight of the coupling agent.

Coupling efficiency depends on a number of factors such as the amount of the coupling agent, temperatures and other physical conditions used. The coupling efficiency can vary, for example, from >50%, or >60%, or >70%, or >80%, or >90%.

Properties of Associative Rheology Modifier: In embodiments, the associative rheology modifier has an apparent viscosity of 100,000-2,000 cP at a low shear rate from 1,500-5,000 s$^{-1}$ and an apparent viscosity of 2,000-100 cP at a high shear rate from 5,000-20,000 s$^{-1}$.

In embodiments, the associative rheology modifier has a water solubility of >10 wt. % concentration at a temperature of 25° C., or 10-100 wt. %, or 20-90 wt. %, or 30-70 wt. %, or 40-60 wt. %, or >25 wt. %, or ≤200 wt. %, or ≤300 wt. %, based on the total weight of the associative rheology modifier and water.

In embodiments, the associative rheology modifier has a linear or a branched structure, with a molecular weight of 1,500-25,000 g/mol, or 1,500-20,000 g/mol, or 1,500-18, 000 g/mol, or >1,200 g/mol, or <20,000 g/mol.

In embodiments, the associative rheology modifier has density of >1, or 1.01-1.2, or 1.02-1.1, or 1.021-1.09, or 1.022-1.03, or <1.1.

Applications: The associative rheology modifier can be supplied as a pourable and pumpable liquid for a number of applications, including but is not limited to oil field chemicals, coatings, paint applications, cleaning agents, cosmetics, aqueous pigment pastes, automotive finishes, industrial coatings, printing inks, lubricating greases, plaster paints and wall paints, textile coatings, filler dispersions, adhesives, detergents, wax dispersions, polishes, auxiliaries for tertiary mineral oil production, food industries, paper industries etc.

In applications, the associative rheology modifier functions to modify the rheological behavior of end-use compositions such that, on the one hand, in a state of low shear, the composition has a high viscosity. Therefore, in use when the composition is coated or is applied to a vertical surface, there is minimal running (curtaining). On the other hand, the mechanical stress in a state of high shear, lowers the viscosity (shear-thinning). In use, the composition becomes highly mobile, and can be conveyed through a narrow nozzle as applied by spray gun. The associative rheology modifier improves sag resistance by a rapid but controlled viscosity increase after application, also reliably prevent sedimentation of additives such as pigments during transport and storage of the composition.

In embodiments of paint applications, e.g., a waterborne paint composition, the paint composition comprises 5-15 wt. % of water, 15-30 wt. % of at least a pigment, 20-60 wt. % of at least a binder, 0.01-5 wt. % of the associative rheology modifier, and 1-15 wt. % of at least an additive, based on the total weight % of the waterborne paint composition. The paint can be prepared by dispersing water, pigments, and other additives in a grinder. A binder based on styrene-acrylic copolymer is added, then followed by the associative rheology modifier.

In embodiments, a water-borne paint composition prepared with the associative rheology modifier has a low shear viscosity (LSV) 0.001-1 s$^{-1}$, medium shear viscosity (MSV) 1-1000 s$^{-1}$, and high shear viscosity (HSV) $10^3$-$10^6$ s$^{-1}$. The LSV correlated to settling, sagging, and leveling of the waterborne paint composition. The MSV correlates to brush loading and rolling, whereas HSV correlates to spraying of the waterborne paint composition.

The thinning effect of the waterborne paint composition is measured by Rheometer TA, DHR-2, cone 25 mm, 0.1 rad at 25° C. shear ramp at shear rate of 0.01-250 s$^{-1}$. The stability of the waterborne paint composition can be confirmed by measuring the viscosity of the composition at various intervals, for example, measuring the viscosity immediately after preparation of the composition at 25° C., after 7 days at 25° C., after 7 days at 50° C., after 11 days at 25° C., after 11 days at 50° C., after 14 days at 50° C.

Examples: The following illustrative examples are intended to be non-limiting.

Materials: The following materials are used.

The PEG materials used in examples have different molecular weights, for example, PEG1-3,350 g/mol, PEG2-1,450 g/mol, PEG3-2,000 g/mol, and PEG4-8,000 g/mol.

SYLVAROS™ HYR: A tall oil resin with acid number 179 mg KOH/g and sulfur content 547 ppm commercially available from Kraton Corp.

Synthesis of Rheology Modifier Precursors.

Example 1: About 420.49 g of a polyethylene glycol (PEG1) was charged in a round bottom flask. The round bottom flask was heated to a temperature of 180° C. under mechanical stirring at 300 rpm and under nitrogen flow to obtain a molten PEG. Into the molten PEG, about 79.5 g of SYLVAROS™ HYR and about 7.0 g of hypophosphorous acid 50% aqueous solution were added slowly under continuous stirring at 300 rpm. The reaction mixture was then heated from 180-220° C. over a period of an hour. The acid value of the reaction content was monitored through the titration. The reaction was continued at 220° C. to obtain the acid value of ≤10 mg KOH/g of the reaction content. The reaction content was cooled down to a room temperature to obtain a rheology modifier precursor with an acid value of 2.8, a Gardner color of 3.3, a viscosity of 5,331 cP, a Mw of 10,707 g/mol and a PI of 2.24.

Example 2: Example 1 was repeated, except that 0.25 wt. % of additional catalyst dibutyltin oxide (DBTO) with about 41 g of hypophosphorous acid 50% (aqueous solution), about 1,737 g of PEG1, and about 313 g of SYLVAROS™ HYR were used in the synthesis of the precursor, giving a rheology modifier precursor with an acid value of 3.5, a Gardner color value of 7.7, a viscosity of 8,240 cP, a Mw of 8,393 g/mol and a PI of 2.12.

Example 3: Example 1 was repeated, except that 42 g of 50% hypophosphorous acid (aqueous solution), ~1,000 g of PEG2, and ~407 g of SYLVAROS™ HYR were used, giving a rheology modifier precursor with an acid value of 13.4, a Gardner color value of 3.3, a viscosity of 3,059 cP, a Mw of 3173 g/mol and a PI of 1.99.

Example 4: Example 1 was repeated, except that about 26 g of 50% hypophosphorous acid (aqueous solution), ~1,010 g of PEG3, and ~313 g of SYLVAROS™ HYR were used, giving a rheology modifier precursor with an acid value of 9.6, a Gardner color value of 1.3, a viscosity of 4,889 cP, a Mw of 5,157 g/mol and a PI of 2.51.

Synthesis of Associative Rheology Modifiers.

Example 5: In a reaction vessel, about 50 g of the rheology modifier precursor obtained in Example 1 was mixed with about 150 g of deionized water under stirring at 300 rpm, at room temperature (22° C.) and under nitrogen atmosphere. About 3 g of pentaerythritol tetra(3-mercapto-propionate) was added dropwise over 25 min. into the reaction mixture. The color of the reaction mixture was changed from amber brown to a pale yellow with increased viscosity. About 10.6 g of 5 wt. % of sodium persulfate stock solution in deionized water was added dropwise. A temperature drop was observed from room temperature (22° C.) to 17° C. The temperature was then increased up to 75° C. over 60 min. Increase in viscosity was observed in the reaction vessel and to ensure complete reaction, heating was increased to 100° C. for refluxing. After refluxing for 60 min. the reaction content was transferred into the glass jar to collect an associative rheology modifier with a Gardner color value of 7.3 and a viscosity of 1,297 cP.

Example 6: Example 5 was repeated, except that there was no refluxing and the reaction was completed at a temperature of 75° C., for an associative rheology modifier with Gardner color of 6.5 and a viscosity of 1,242 cP.

Example 7: Example 5 was repeated, except that 1 wt. % of radical initiator as potassium persulfate was used instead of 10.6 g of sodium persulfate. An associative rheology modifier with Gardner color of 6.7 and a viscosity of 1,076 cP.

Example 8: In a reaction vessel, about 9.7 g of the rheology modifier precursor obtained in Example 1 was mixed with about 0.97 g of N,N'-1,3-phenylenedimaleimide (PMD) and the mixture was heated at 180° C. with continuous stirring at 350 rpm. The stirring speed was increased to 1,200 rpm and the temperature for heating was augmented to 205° C. The reaction was continued at 205° C. for 60 min. resulting in change in color from cloudy light brown-yellow to a clear yellow-orange with increase in viscosity. The reaction mixture was then cooled down to 25° C. to collect an associative rheology modifier with a viscosity of 2,894 cP.

Example 9: Example 8 was repeated, except that about 0.1 mL of radical initiator 2-5-dimethyl-2-5-di-tert-butylper-oxy-hexane (DHBP) was added at 205° C. and amount of the rheology modifier precursor was about 11.82 g. An associative rheology modifier has a viscosity of 5807 cP.

Example 10: Example 8 was repeated, except that ~11.43 g of the rheology modifier precursor obtained in Example 1 was mixed with about 0.57 g of PMD, which was 4.78 wt. % of the coupling agent. An associative rheology modifier has a viscosity of 3,744 cP.

Example 11: Example 8 was repeated, except that 11.32 g of the rheology modifier precursor obtained in Example 1 was mixed with about 0.60 g of PMD, which was 5.03 wt. % of the coupling agent. An associative rheology modifier has a viscosity of 2,852 cP.

Example 12: In a reaction vessel, about 16.75 g of the rheology modifier precursor obtained in Example 1 was mixed with 0.173 g of trimethylolpropane trimethacrylate (TMPTAM) and 0.2 g of DHBP. Once molten, 0.11 g (200 ppm) of inhibitor phenothiazine was added slowly under low nitrogen protection. The reaction mixture was heated to 205° C. temperature with continuous stirring at 350 rpm. The viscosity of the reaction mixture was started to increase and then the temperature of the reaction mixture was increased to 250° C. After 30 min., the color of the reaction mixture was changed from light yellow to clear pale yellow. The reaction was cooled down to room temperature to collect an associative rheology modifier with a viscosity of 3,719 cP.

Example 13: Example 12 was repeated, except that about 0.603 g of trimethylolpropane triacrylate (TMPTA) coupling agent was used and the reaction was conducted in the absence of DHBP radical initiator, with 500 ppm of phenothiazine. An associative rheology modifier has a viscosity of 4,071 cP.

The TMPTA coupling agent for coupling the rheology modifier precursor shows better viscosity in comparison with the TMPTAM coupling agent.

Example 14: Example 12 was repeated, except that the rheology modifier precursor was used obtained from Example 4 and about 4.16 wt. % (0.682 g) of TMPTA as the coupling agent was used. An associative rheology modifier has a viscosity of 5,089 cP.

Example 15: Example 12 was repeated, except that the rheology modifier precursor was used obtained from Example 4 and about 5.29 wt. % (0.859 g) of TMPTA as the coupling agent was used. An associative rheology modifier has a viscosity of 8,110 cP.

Example 16: Example 12 was repeated, except that the rheology modifier precursor was used obtained from Example 4 and about 6.41 wt. % (1.020 g) of TMPTA as the coupling agent was used. An associative rheology modifier has a viscosity of 8,580 cP.

Example 17: In a reaction vessel, about 195.80 g of the rheology modifier precursor was used obtained from Example 1 and heated to a temperature of 150° C. with stirring at 200 rpm. After complete melting of the associative rheology modifier, about 3.99 g of trimethylolpropane triacrylate (TMPTA) and 0.2 g of DHBP were slowly added to the reaction vessel under continuous stirring. Once molten 1,000 ppm of phenothiazine was added slowly under low nitrogen protection. The temperature of the reaction mixture was increased from 150° C. to about 250° C. over a period of an hour. The reaction was continued for 90 min. at 250° C. temperature. The reaction was cooled down to a room temperature to collect an associative rheology modifier with a viscosity of 15,880 cP.

Example 18: Example 17 was repeated, except that about 2.68 wt. % (5.223 g) of TMPTA as the coupling agent was used. An associative rheology modifier has a viscosity of 12,380 cP.

Example 19: Example 17 was repeated, except that about 3.25 wt. % (6.295 g) of TMPTA as the coupling agent was used. An associative rheology modifier has a viscosity of 65,690 cP.

Example 20: Example 17 was repeated, except that about 3.96 wt. % (7.616 g) of TMPTA as the coupling agent was used. An associative rheology modifier was gelled.

The associative rheology modifier obtained in Example 19 was slightly gelled due to the higher amount of the coupling agent (3.25 wt. %). Whereas the sample obtained from Example 20 was completely gelled owing to higher amount of the coupling agent, which was about 3.96 wt. %.

Process of preparation of waterborne paint composition.

Example 21: About 7.37 g of water, 27.06 g of $TiO_2$, and desired number of additives were mixed in a pearl mill NETZSCH at 1,500-2,000 RPM for 10-25 minutes. To this mixture, about 57.22 g of styrene-acrylic copolymer-based binder was added followed by dropwise addition of 0.21 g of the associative rheology modifier. The addition of the associative rheology modifier is conducted by using dissolver IKA-WERKE at 500-1,000 RPM at room temperature (25° C.). The waterborne paint composition was obtained after homogenous mixing of above components.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one reference. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. The recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. An associative rheology modifier obtained by coupling of a rheology modifier precursor with a coupling agent,
    wherein the rheology modifier precursor is formed by
        reacting a rosin acid with a polyether at a mole ratio of the rosin acid to the polyether of >2:1, at a temperature from 180-350° C. and in the presence of an acid catalyst,
        the polyether has a molecular weight (Mw) of 500-10, 000 g/mol; and
        the rheology modifier precursor has a water solubility of >10 wt. % concentration;
    wherein the coupling agent is present in an amount of 0.1-15 wt. %, based on the total weight of the coupling agent and the rheology modifier precursor, wherein the coupling agent is reactive to carbon-carbon double bonds in the rheology modifier precursor and selected from the group consisting of sulfur-based agents, peroxide-based agents, acrylate-based agents, tellurium, selenium, polysulfide polymers, metallic oxides, diisocyanates, and mixtures thereof;
    wherein the associative rheology modifier has
        a molecular weight (Mw) of 1,500-25,000 g/mol; and
        an apparent viscosity of 100,000-2,000 cP at a shear rate from 1,500-5,000 $s^{-1}$ and an apparent viscosity of 2,000-100 cP at a shear rate from 5,000-20,000 $s^{-1}$, at a concentration of 25 wt. % in water and a temperature of 25° C.

2. The associative rheology modifier of claim 1, wherein the polyether has at least one functional group selected from a hydroxyl group and an amine group.

3. The associative rheology modifier of claim 1, wherein the polyether is selected from the group of polyether glycols, polyetheramine, and mixtures thereof.

4. The associative rheology modifier of claim 3, wherein the polyether glycols are selected from a polyethylene glycol, a polypropylene glycol, a polybutylene glycol, a polytetrahydrofuran, a polytetramethylene glycol, a polytetramethylene ether glycol, and mixtures thereof.

5. The associative rheology modifier of claim 1, wherein the polyether is a polyethylene glycol, and wherein the rosin acid is reacted with the polyethylene glycol to obtain a polyethylene glycol end-capped rosin with an ester linkage.

6. The associative rheology modifier of claim 1, wherein the polyether is a polyetheramine, and wherein the rosin acid is reacted with the polyetheramine, to obtain a polyetheramine end-capped rosin with an amide linkage.

7. The associative rheology modifier of claim 1, wherein the rosin acid is reacted with an adduction agent to obtain a rosin acid adduct through a Diels-Alder reaction, wherein the adduction agent is selected from the group consisting of unsaturated acids, anhydrides, and mixtures thereof.

8. The associative rheology modifier of claim 7, wherein the rosin acid adduct is reacted with the polyether to form a rheology modifier precursor.

9. The associative rheology modifier of claim 1, wherein the rheology modifier precursor has the water solubility of 20-100 wt. % concentration.

10. The associative rheology modifier of claim 1, wherein the mole ratio of the rosin acid to the polyether is from 2:1-4:1.

11. The associative rheology modifier of claim 1, wherein the acid catalyst is a Brønsted acid.

12. The associative rheology modifier of claim 11, wherein the Brønsted acid is at least one selected from the group consisting of mineral acids, organic acids, heteropolyacids, zeolites, acid clays, sulfated zirconia, and mixtures thereof.

13. The associative rheology modifier of claim 11, wherein the Brønsted acid is at least one selected from hydrochloric acid, nitric acid, phosphoric acid, hypophosphorous acid, sulfuric acid, boric acid, hydrofluoric acid, hydrobromic acid, hydroiodic acid, toluenesulfonic acid, formic acid, acetic acid, oxalic acid, trifluoroacetic acid, and mixtures thereof.

14. The associative rheology modifier of claim 1, wherein the associative rheology modifier has a water solubility of 10-100 wt. % concentration.

15. The associative rheology modifier of claim 1, wherein the rheology modifier precursor has an acid value of <30 mg KOH/g.

16. The associative rheology modifier of claim 1, wherein the coupling agent is selected from trimethylolpropane triacrylate, trimethylolpropane trimethacrylate, 1,6-bishexanedioldiacrylate, divinylbenzene, 1,3-diisopropenylbenzene, trimethylallyl isocyanurate, triallyl isocyanurate, 1,3,5-triazine-2,4,6(1H,3H,5H)-trithione, pentaerythritol tetra(3-mercaptopropionate), tris[2-(3-mercaptopropionyloxy) ethyl] isocyanurate, 1,2-ethanedithiol, 2,4,6-triallyloxy-1,3, 5-triazine, N,N-1,3-phenylenediamaleimide, and mixtures thereof.

17. The associative rheology modifier of claim 1, wherein the coupling agent is present in an amount of 0.3-12 wt. %, based on the total weight of the coupling agent and the rheology modifier precursor.

18. A composition comprising the associative rheology modifier of claim 1, wherein the composition is for use in coatings, paints, cosmetics, automotive finishes, printing inks, filler dispersions, adhesives, detergents, wax dispersions, food industries, and paper industries.

19. A waterborne paint composition comprising:

5-15 wt. % of water;

15-30 wt. % of at least a pigment;

20-60 wt. % of at least a binder;

0.01-5 wt. % of the associative rheology modifier of claim 1; and 1-15 wt. % of at least an additive, based on the total weight of the waterborne paint composition.

20. A process to prepare an associative rheology modifier comprising:

providing a rheology modifier precursor obtained by reacting a rosin acid with a polyether at a mole ratio of the rosin acid to the polyether of >2:1, at a temperature from 180-350° C. and in the presence of an acid catalyst, wherein the polyether has a molecular weight (Mw) of 500-10,000 g/mol, and the rheology modifier precursor has a water solubility of >10 wt. % concentration;

reacting the rheology modifier precursor with a coupling agent present in an amount of 0.1-15 wt. %, based on the total weight of the coupling agent and the rheology modifier precursor, by heating the mixture at a temperature from 25-250° C. for 5 min.-60 min. to obtain the associative rheology modifier;

wherein the coupling agent is reactive to carbon-carbon double bonds in the rheology modifier precursor and selected from the group consisting of sulfur-based agents, peroxide-based agents, acrylate-based agents, tellurium, selenium, polysulfide polymers, metallic oxides, di-isocyanates, and mixtures thereof;

wherein the associative rheology modifier has:

a molecular weight (Mw) of 1,500-25,000 g/mol, and an apparent viscosity of 100,000-2,000 cP at a shear rate from 1,500-5,000 s-1 and an apparent viscosity of 2,000-100 cP at a shear rate from 5,000-20,000 s-1, at a concentration of 25 wt. % in water and a temperature of 25° C.

* * * * *